United States Patent [19]
Yano et al.

[11] Patent Number: 5,564,283
[45] Date of Patent: Oct. 15, 1996

[54] EXHAUST EMISSION CONTROL SYSTEM IN INTERNAL COMBUSTION ENGINE

[75] Inventors: Toru Yano; Hidehito Ikebe; Kazuhide Terada, all of Saitama, Japan

[73] Assignee: Honda Giken Kogyo Kabushiki Kaisha, Tokyo, Japan

[21] Appl. No.: 314,641

[22] Filed: Sep. 29, 1994

[30] Foreign Application Priority Data

Sep. 30, 1993 [JP] Japan .................................. 5-244057

[51] Int. Cl.⁶ ................................................ F02M 25/06
[52] U.S. Cl. ................................ 60/274; 60/278; 60/285
[58] Field of Search .............................. 60/278, 285, 274

[56] References Cited

U.S. PATENT DOCUMENTS

| | | | |
|---|---|---|---|
| 5,172,550 | 12/1992 | Takeshima | 60/278 |
| 5,201,173 | 4/1993 | Fujimoto | 60/278 |
| 5,209,061 | 5/1993 | Takeshima | 60/278 |
| 5,426,934 | 6/1995 | Hunt | 60/278 |

Primary Examiner—Douglas Hart
Attorney, Agent, or Firm—Lyon & Lyon

[57] ABSTRACT

In an exhaust emission control system in an internal combustion engine which includes a spark plug disposed to face a combustion chamber, an intake system having a fuel injection valve disposed therein, an exhaust system having a catalytic converter incorporated therein and filled with a catalyst for reducing nitrogen oxide ($NO_x$) in the presence of hydrocarbons in an oxidizing atmosphere, and an exhaust gas circulation amount control means capable of measuring and controlling the amount of exhaust gas circulated from the exhaust system to the intake system. The amount of exhaust gas circulated by the exhaust gas circulation amount control means the amount and timing of fuel injected by the fuel injection valve and the timing of ignition of the spark plug are controlled by a control unit, so that the amount of $NO_x$ discharged, is detected by the $NO_x$ detector in the exhaust system at a location downstream from the catalytic converter, is equal to or less than an acceptable amount of $NO_x$ discharged which acceptable amount is set in accordance with the number of revolutions of the engine detected by a revolution-number detector as well as the engine load detected by a load detector. Thus, it is possible to control the concentration and type of hydrocarbons and the temperature of the catalyst to increase the elimination rate of $NO_x$.

15 Claims, 5 Drawing Sheets

EXHAUST EMISSION CONTROL SYSTEM IN INTERNAL COMBUSTION ENGINE

BACKGROUND OF THE INVENTION

1. Field of the Invention

The present invention relates to an exhaust emission control system in an internal combustion engine comprising a spark plug disposed to face a combustion chamber, an intake system in which a fuel injection valve is disposed, an exhaust system having a catalytic converter incorporated therein and filled with a catalyst for reducing nitrogen oxide ($NO_x$) in the presence of hydrocarbons in an oxidizing atmosphere, and an exhaust gas circulation amount control means capable of measuring and controlling the amount of exhaust gas circulated from the exhaust system to the intake system.

2. Description of the Prior Art

Such an exhaust emission control system has been conventionally known, for example, from Japanese Patent Application Laid-Open No. 156142/91.

In the above prior art system, the concentration of hydrocarbons in an exhaust gas is increased in order to increase the elimination rate of $NO_x$ when the temperature of the catalyst is high. However, in order to sufficiently increase the elimination rate of $NO_x$ by the catalyst for reducing the $NO_x$ in the presence of hydrocarbons in an oxidizing atmosphere, a control taking the concentration and type of hydrocarbons and temperature of the catalyst into consideration is required.

SUMMARY OF THE INVENTION

Accordingly, it is an object of the present invention to provide an exhaust emission control system in an internal combustion engine, wherein the concentration and type of hydrocarbons and temperature of the catalyst is controlled to increase the elimination rate of $NO_x$.

To achieve the above object, according to a first aspect and feature of the present invention, there is provided an exhaust emission control system in an internal combustion engine comprising a spark plug disposed to face a combustion chamber, an intake system in which a fuel injection valve is disposed, an exhaust system having a catalytic converter incorporated therein and filled with a catalyst for reducing nitrogen oxide ($NO_x$) in the presence of hydrocarbons in an oxidizing atmosphere, and an exhaust gas circulation amount control means capable of measuring and controlling the amount of exhaust gas circulated from the exhaust system to the intake system, the control system further comprising: a revolution-number detector for detecting the number of revolutions of the engine per unit of time, i.e. rpm; a load detector for detecting an engine load; a nitrogen oxide detector mounted in the exhaust system at a location downstream from the catalytic converter for detecting the amount of discharged nitrogen oxide ($NO_x$); and a control unit for controlling the amount of exhaust gas circulated by the exhaust gas circulation amount control means, the amount and timing of fuel injected by the fuel injection valve and the timing of the ignition of the spark plug, such that the amount of $NO_x$ discharged detected by the $NO_x$ detector becomes equal to or less than an acceptable amount of $NO_x$ discharged, which is set in accordance with the number of revolutions of the engine and the engine load.

With the above feature, it is possible to control the concentration of hydrocarbons, the temperature of the catalyst and the type of hydrocarbons participating with the elimination rate of $NO_x$, thereby contributing to an increase in the elimination rate of $NO_x$.

In addition to the first feature, a second feature is that the control system further includes a catalyst temperature detector mounted on the catalytic converter for detecting the temperature of the catalyst, and the control unit controls the exhaust gas circulation amount control means, so that the amount of exhaust gas circulated is increased, as the temperature of the catalyst increases.

With the above feature, it is possible to produce hydrocarbons of the type required in accordance with the temperature of the catalyst, thereby effectively increasing the elimination rate of $NO_x$.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment in connection with the accompanying drawings.

Figure 1:
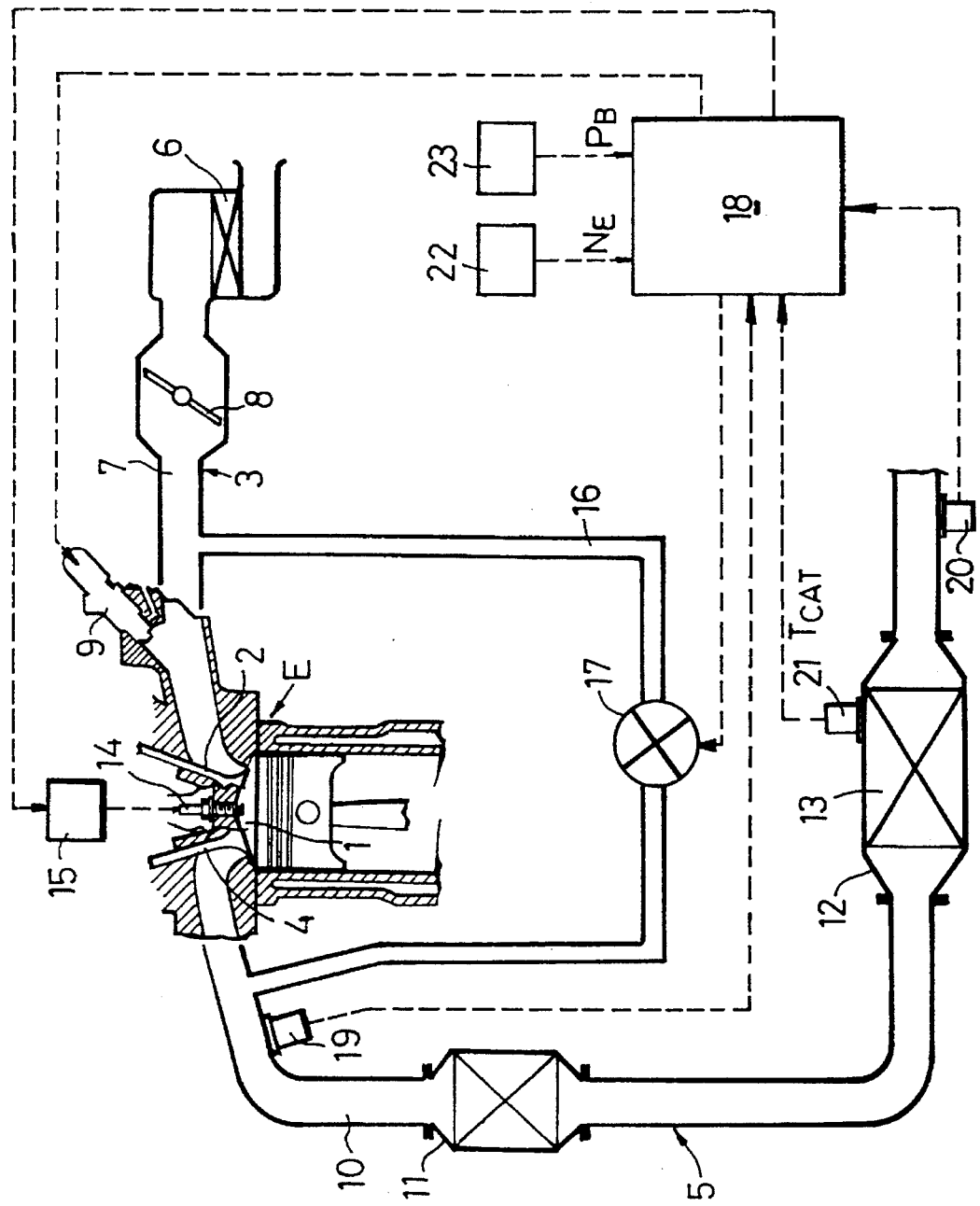
FIG. 1 is a schematic view of the entire exhaust emission control system according to the present invention.

Referring first to FIG. 1, an intake system 3 is connected to a combustion chamber 1 of an internal combustion engine E through an intake valve 2. An exhaust system 5 is also connected to the combustion chamber 1 through an exhaust valve 4. The intake system 3 includes a throttle valve 8 provided in an intermediate portion of an intake passage 7 having an air cleaner 6 at an upstream end of the intake system 3, and a fuel injection valve 9 provided at a downstream end of the intake passage 7 for injecting a fuel. The exhaust system 5 includes a first catalytic converter 11 filled with a ternary catalyst and a second catalytic converter 12, which converters are incorporated in series in an intermediate portion of an exhaust passage 10. The second catalytic converter 12 is filled with a catalyst 13 for reducing nitrogen oxides ($NO_x$) in the presence of hydrocarbons in an oxidizing temperature, i.e. a so-called lean $NO_x$ catalyst.

A spark plug 14 is disposed in an engine body to face the interior of the combustion chamber 1 and ignited by an igniter 15. An exhaust gas circulation conduit 16 is provided to extend between the exhaust passage 10 upstream of the first catalytic converter 11 in the exhaust system 5 and the intake passage 7 downstream of the throttle valve 8 in the intake system 3. An exhaust gas circulation amount control valve 17 as an exhaust gas circulation amount control means is incorporated in an intermediate portion of the exhaust gas circulation conduit 16. The valve 17 can control the amount of exhaust gas circulated from the exhaust system to the intake system 3.

The injection timing of the fuel by the fuel injection valve 9, the ignition timing of the spark plug 14 by the igniter 15 as well as the amount of exhaust gas circulated by the exhaust gas circulation amount control valve 17 are controlled by a control unit 18 comprised of a microcomputer. Connected to the control unit 18 are an air-fuel ratio detector 19 for detecting the air-fuel ratio from the composition of the exhaust gas at the upstream end of the exhaust system 5, an $NO_x$ detector 20 for detecting the amount of nitrogen oxide ($NO_x$) discharged in the exhaust passage 10 at a location downstream from the second catalytic converter 12, a catalyst temperature detector 21 mounted on the second catalytic converter 12 for detecting the temperature $T_{CAT}$ of the catalyst 13, a revolution-number detector 22 for detecting a number $N_E$ of revolutions of the internal combustion engine E, a load detector 23 for detecting the intake passage $P_B$ in the intake passage 7 as an engine load, and the like.

Figure 2:
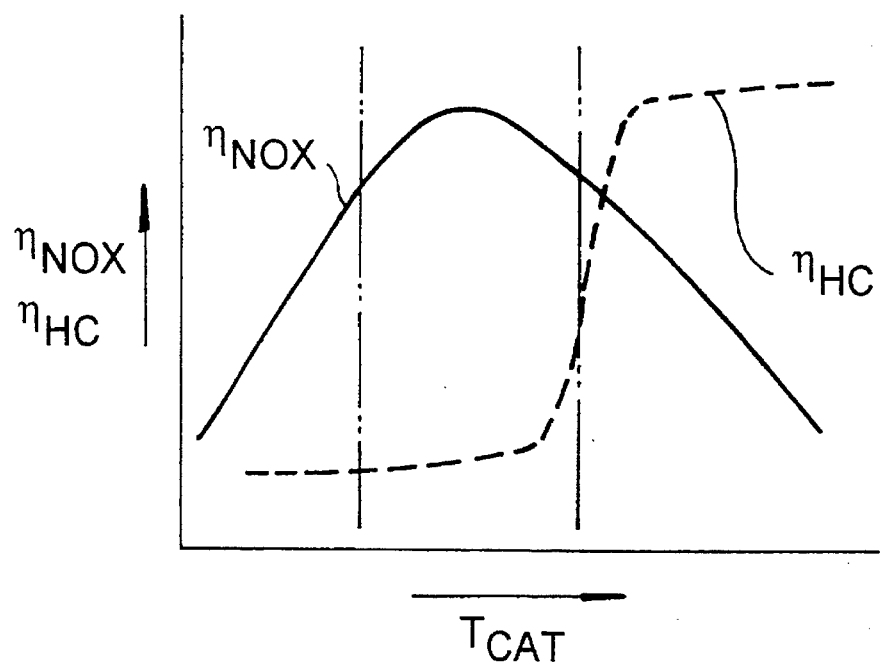
FIG. 2 is a graph illustrating the relationship between the elimination rate of $NO_x$ and the elimination rate of hydrocarbons with respect to the temperature of the catalyst.
Figure 3:
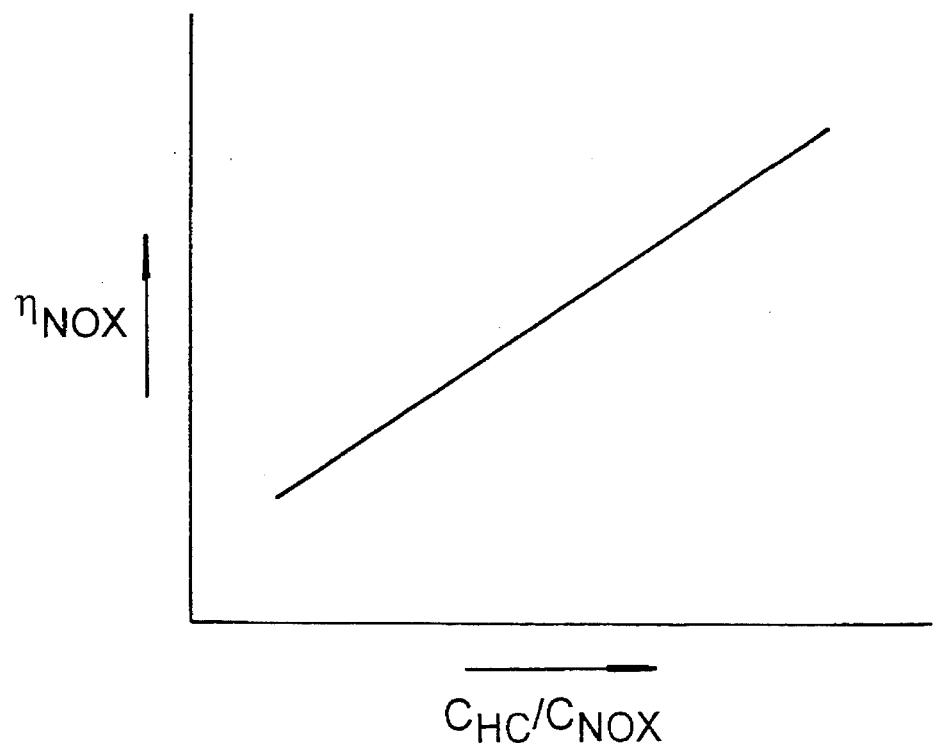
FIG. 3 is a graph illustrating the relationship between the elimination rate of $NO_x$ and the concentration of hydrocarbons.
Figure 4:
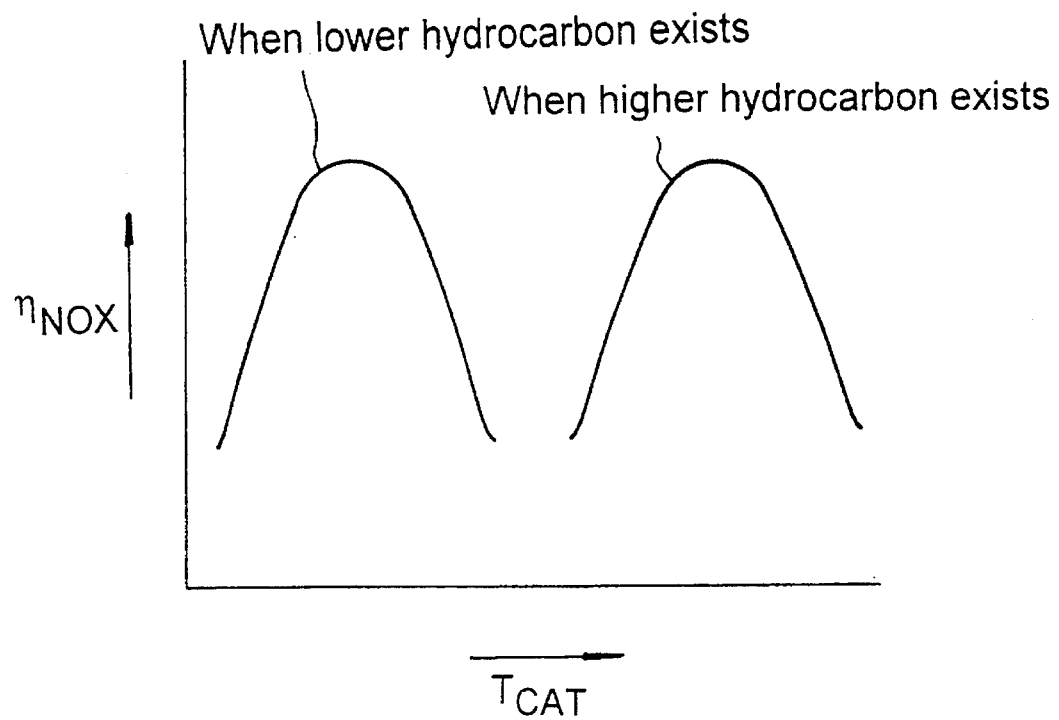
FIG. 4 is a graph illustrating the elimination rate of $NO_x$ depending upon the type of hydrocarbons in accordance with the temperature of the catalyst.

Three factors, ie. . . . . , the temperature $T_{CAT}$ of the catalyst, the concentration of the hydrocarbons (HC) and the type of hydrocarbons relate to the elimination rate of nitrogen oxide ($NO_x$) in the second catalytic converter 12. That is, a relationship as shown in FIG. 2 is established between the temperature $T_{CAT}$ of the catalyst and the elimination rate $\eta_{NOX}$ of nitrogen oxide ($NO_x$). And a relationship as shown in FIG. 3 is established between the concentration $C_{HC}$ of hydrocarbons with respect to the concentration of nitrogen oxide $C_{NOX}$ and the elimination rate $\eta_{NOX}$ of nitrogen oxide ($NO_x$). When the temperature $T_{CAT}$ of the catalyst is low as shown in FIG. 4, the elimination rate $\eta_{NOX}$ of nitrogen oxide ($NO_x$) is increased in the presence of a lower hydrocarbon. On the other hand, when the temperature $T_{CAT}$ of the catalyst is high, the elimination rate $\eta_{NOX}$ of nitrogen oxide ($NO_x$) is increased in the presence of a higher hydrocarbon. As used herein and will be understood by those skilled in the art, "lower hydrocarbon" and "higher hydrocarbon" mean two different types of hydrocarbons that are present in the exhaust gases under different conditions.

The concentration of hydrocarbons varies depending upon the amount of fuel injected by the fuel injection valve 9 and the injection timing. More specifically, when the amount of fuel injected is large, the concentration of hydrocarbons becomes high. If the timing of completion of the fuel injection is controlled to be shifted out of the intake stroke in a lean combustion range and to be shifted into the intake stroke in a rich combustion range, the concentration of hydrocarbons is increased.

The temperature $T_{CAT}$ of the catalyst, i.e., the temperature of the exhaust gas is lowered if the ignition timing for the spark plug 14 is controlled to be advanced, and such temperature is increased if the timing of the ignition is controlled to be delayed. The elimination rate $N_{NOX}$ of nitrogen oxide ($NO_x$) in the first catalytic converter 11 also varies depending upon the temperature $T_{CAT}$ of the catalyst as shown in FIG. 2. Therefore, in order to maintain the concentration of hydrocarbons in the second catalytic converter 12 at a high level, it is necessary to set the temperature $T_{CAT}$ of the catalyst in a range in which the elimination rate $\eta_{NOX}$ of $NO_x$ is high and the elimination rate $\eta_{HC}$ of hydrocarbons is low as shown by a dashed line in FIG. 2.

Further, the type of hydrocarbon varies depending upon the amount of exhaust gas circulated, so that the amount of a higher hydrocarbon in the exhaust gas is increased, as the amount of exhaust gas circulated is increased.

Figure 5:
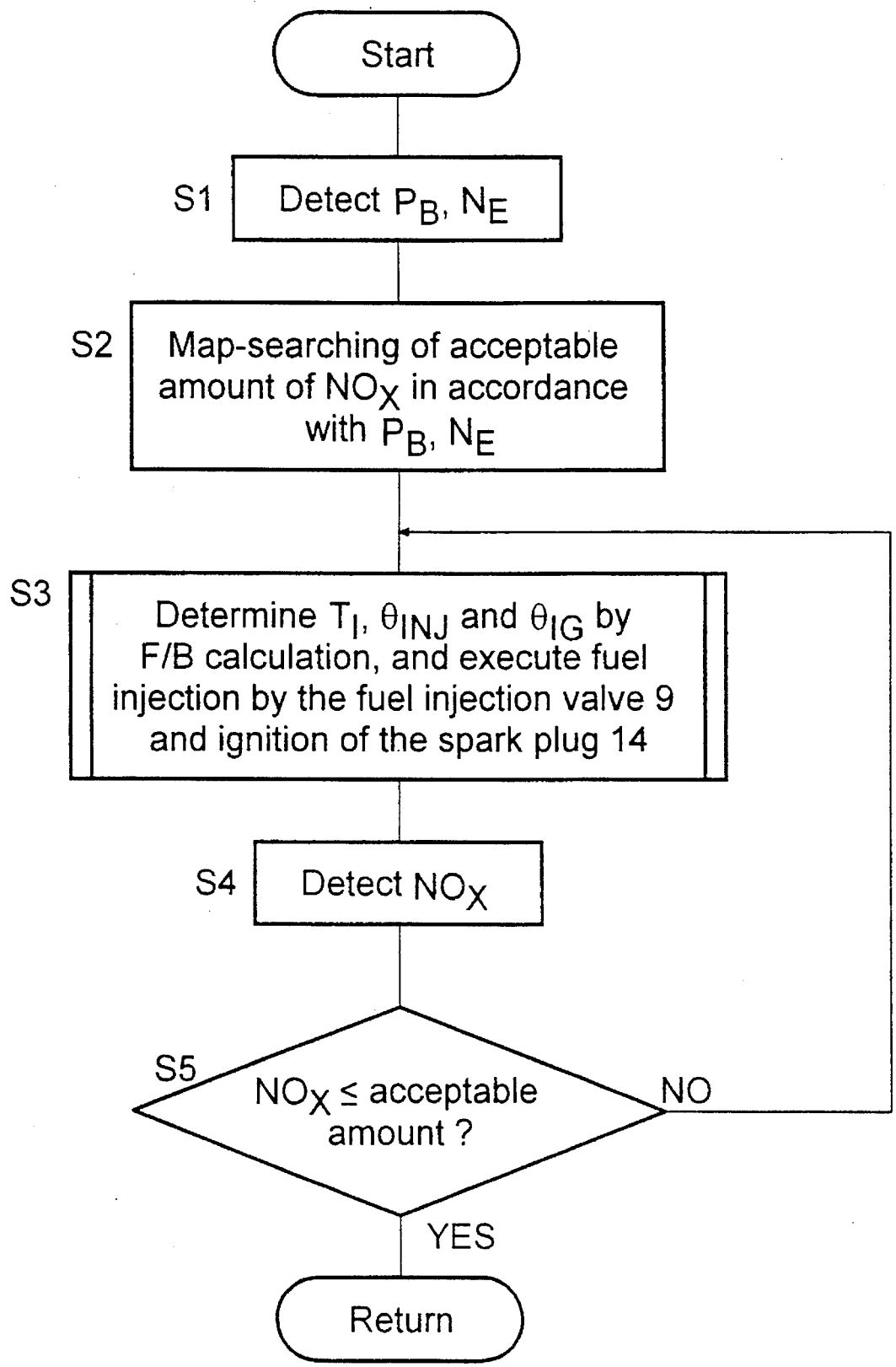
FIG. 5 is a flow chart illustrating a procedure for controlling the amount and timing of the fuel injected and the timing of the ignition.

A procedure for controlling the amount and timing of injection of the fuel by the fuel injection valve 9 as well as the timing of the ignition of the spark plug 14 is established in the control unit 18 as shown in FIG. 5. At step S1 of this procedure, an intake pressure $P_B$ and a number $N_E$ of revolutions of the engine per unit of time are detected. At step S2, an acceptable amount of discharged nitrogen oxide ($NO_x$), which is predetermined as a map in accordance with the intake pressure $P_B$ and the number $N_E$ of revolutions of the engine, is searched.

At step S3, a time $T_1$ of injection by the fuel injection valve 9 which controls the amount of fuel injected, a timing $\Theta_{INJ}$ of injection of the fuel and a timing $\Theta_{IG}$ of ignition of the spark plug 14 are determined by a feedback calculation based on a difference between the acceptable amount of nitrogen oxide ($NO_x$) discharged and the detected amount of nitrogen oxide ($NO_x$) discharged, and the fuel injection by the fuel injection valve 9 and ignition of the spark plug 14 are executed.

In this case, in order to increase the concentration of hydrocarbon, the amount of fuel injected by the fuel injection valve 9 is increased. Further, the timing $\Theta_{INJ}$ of injection of the fuel is determined such that the injection of the fuel is completed out of the intake stroke in the lean combustion range and completed within the intake stroke in the rich combustion range. Further, in order to increase the temperature $T_{CAT}$ of the catalyst, the timing of ignition of the spark plug 14 is controlled to be delayed.

At step S4, the amount of discharged nitrogen oxide ($NO_x$) flowing through a portion of the exhaust passage 10 downstream from the second catalytic converter 12 is detected. If it is decided at next step S5 that the detected amount of discharged nitrogen oxide ($NO_x$) exceeds the acceptable amount, the processing is returned to the step S3.

Figure 6:
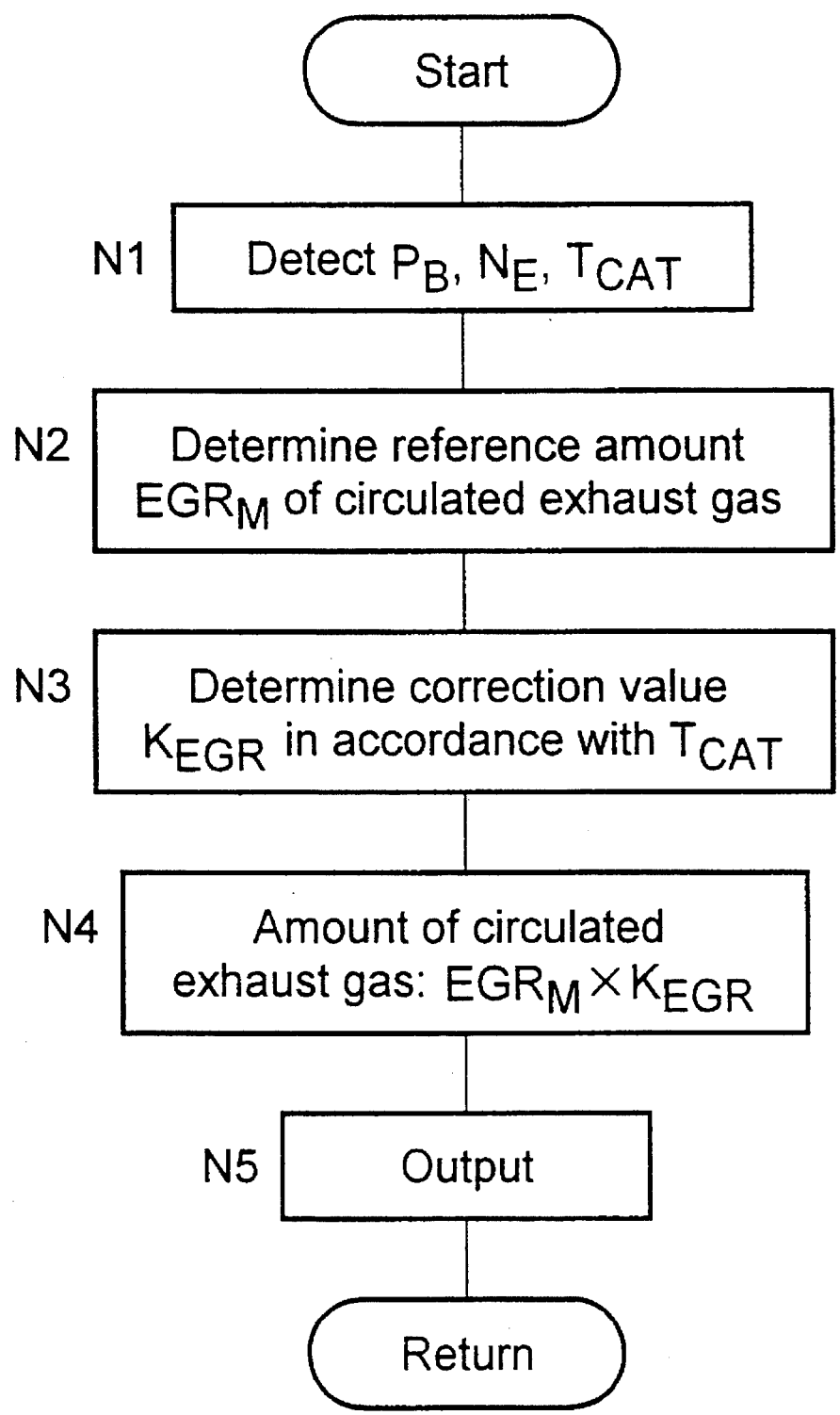
FIG. 6 is a flow chart illustrating a procedure for controlling the amount of exhaust gas circulated.

A procedure for controlling the amount of exhaust gas circulated by the exhaust gas circulation control valve 17 is also established in the control unit 18 as shown in FIG. 6. At step N1 of this procedure, an intake pressure $P_B$, a number $N_E$ of revolutions of the engine and a temperature $T_{CAT}$ of the catalyst are detected. At step N2, a reference amount $EGR_M$ of exhaust gas circulated is searched from a map predetermined in accordance with the intake pressure $P_B$ and the number $N_E$ of revolutions of the engine. The reference amount $EGR_M$ of exhaust gas circulated is set so that the maximum elimination rate of $NO_x$ is achieved when the temperature $T_{CAT}$ of the catalyst is determined in accordance with the intake pressure $P_B$ and the number of $N_E$ of revolutions of the engine.

Figure 7:
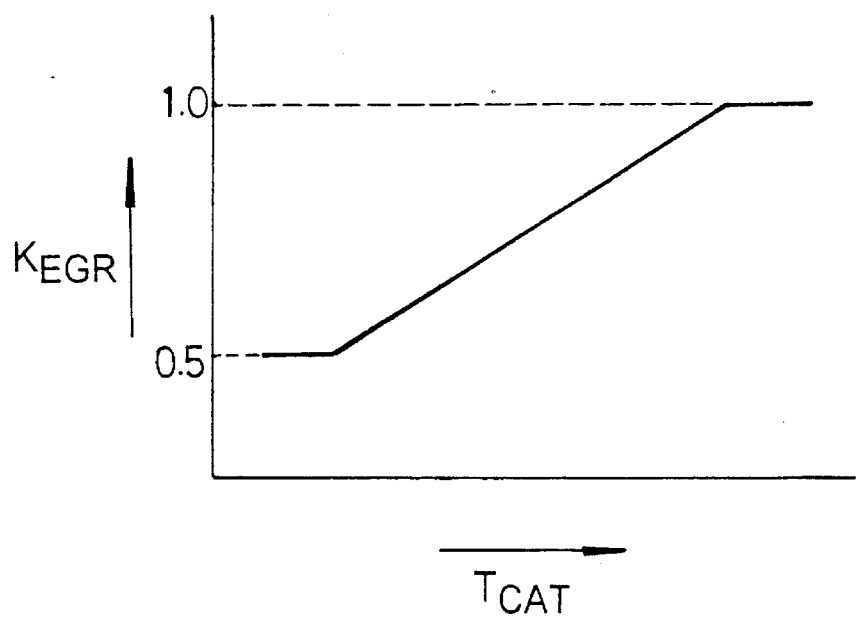
FIG. 7 is a graph illustrating the correction value for the amount of exhaust gas circulated in accordance with the temperature of the catalyst.

At step N3, a correction value $K_{EGR}$ according to the temperature $T_{CAT}$ of the catalyst is determined. That is, as shown in FIG. 7, the correction value $K_{EGR}$ in accordance with temperature $T_{CAT}$ of the catalyst is previously set, and is increased in a range of 0.5 to 1.0 as the temperature $T_{CAT}$ of the catalyst is increased.

At step N4, the amount of exhaust gas to be circulated is calculated as ($EGR_M \times K_{EGR}$). Thus, the amount of exhaust gas circulated is determined so that it is increased, as the temperature $T_{CAT}$ of the catalyst is increased. At the next step N5, the opening degree of the exhaust gas circulation control valve 17 is controlled.

The operation of this embodiment now will be described. The acceptable amount of $NO_x$ discharged is previously determined in accordance with the number $N_E$ of revolutions of the engine as well as the intake pressure $P_B$ as the engine load. The amount of exhaust gas circulated by the exhaust gas circulation control valve 17, the amount and timing of fuel injected by the fuel injection valve 9 and the timing of ignition of the spark plug 14 are controlled by the control unit 18, such that the detected amount of $NO_x$ discharged becomes equal to or less than the acceptable amount.

In order to sufficiently increase the elimination rate of $NO_x$ by the catalyst 13 for reducing the $NO_x$ in the presence of hydrocarbons in an oxidizing atmosphere, a control is required that considers the concentration of hydrocarbons, the type of hydrocarbons and the temperature of the catalyst. The concentration of hydrocarbons can be increased to a value required to increase the elimination rate of $NO_x$ by controlling the amount of fuel injected by the fuel injection valve 9 and the timing of injection. Further, the temperature $T_{CAT}$ of the catalyst can be controlled to a value required to increase the elimination rate of $NO_x$ by controlling the timing of the ignition of the spark plug 14.

As the temperature $T_{CAT}$ of the catalyst is increased, the amount of exhaust gas circulated is increased, whereby the required type of hydrocarbons can be produced in accordance with the temperature $T_{CAT}$ of the catalyst in such a manner that a higher hydrocarbon is increased.

Therefore, it is possible to control the amount of fuel injected by the fuel injection valve 9 and the timing of the injection as well as the timing of the ignition of the spark plug, so that the concentration of hydrocarbons, the temperature of the catalyst and the type of hydrocarbons become optimal. This makes it possible to effectively enhance the elimination rate of $NO_x$.

Although a specific embodiment of the present invention has been described in detail, it will be understood that the present invention is not limited to the above-described embodiment, and various modifications in design may be made without departing from the spirit and scope of the invention defined in claims.

What is claimed:

1. An exhaust emission control system in an internal combustion engine comprising a spark plug disposed to face a combustion chamber, an intake system in which a fuel injection valve is disposed, an exhaust system having a catalytic converter incorporated therein and filled with a catalyst for reducing nitrogen oxide ($NO_x$) in the presence of hydrocarbons in an oxidizing atmosphere, and an exhaust gas circulation amount control means capable of controlling the amount of exhaust gas circulated from the exhaust system to the intake system, said control system further comprising:

a revolution-number detector for detecting a number of revolutions of the engine;

a load detector for detecting an engine load;

a nitrogen oxide detector mounted in the exhaust system at a location downstream from the catalytic converter for detecting an amount of discharged nitrogen oxide ($NO_x$); and a control unit having means for determining an acceptable amount of $NO_x$ to be discharged in the exhaust gas based on said detected number of revolutions of the engine and said detected engine load, and said control unit having means for controlling the amount of exhaust gas circulated by the exhaust gas circulation amount control means, the amount and timing of fuel injected by the fuel injection valve and the timing of ignition of the spark plug, such that the amount of $NO_x$ discharged as detected by said nitrogen oxide detector becomes equal to or less than said determined acceptable amount of $NO_x$ to be discharged.

2. An exhaust emission control system in an internal combustion engine according to claim 1, wherein said control system further includes a catalyst temperature detector mounted on the catalytic converter for detecting a temperature of the catalyst, and said control unit controls the exhaust gas circulation amount control means so that the amount of exhaust gas circulated is increased as the temperature of the catalyst is increased.

3. In an exhaust emission control system in an internal combustion engine comprising a spark plug disposed to face a combustion chamber, an intake system in which a fuel injection valve is disposed, an exhaust system having a catalytic converter incorporated therein and filled with a catalyst for reducing nitrogen oxide ($NO_x$) in the presence of hydrocarbons in an oxidizing atmosphere, an exhaust gas circulation amount control means capable of controlling the amount of exhaust gas circulated from the exhaust system to the intake system, a revolution-number detector for detecting the number of revolutions of the engine, and a load detector for detecting the load on the engine, an improvement in the control system comprising:

a nitrogen oxide detector mounted in the exhaust system at a location downstream from the catalytic converter for detecting an amount of discharged nitrogen oxide ($NO_x$); and control means for determining an acceptable amount of $NO_x$ to be discharged in the exhaust gas based on the detected number of revolutions of the engine and the detected engine load, and said control means having means for controlling at least one of the amount of exhaust gas circulated by the exhaust gas circulation amount control means, the amount of fuel injected by the fuel injection valve, the timing of fuel injected by the fuel injection valve and the timing of ignition of the spark plug for causing the amount of $NO_x$ being discharged, as detected by said nitrogen oxide detector, to become equal to or less than said determined acceptable amount of $NO_x$ to be discharged.

4. An improvement in an exhaust emission control system in an internal combustion engine according to claim 3, wherein said control system further includes a catalyst temperature detector mounted on the catalytic converter for detecting a temperature of the catalyst, and said control means controls the exhaust gas circulation amount control means for increasing the amount of exhaust gas circulated as the temperature of the catalyst increases.

5. An improvement in an exhaust emission control system in an internal combustion engine according to claim 3, wherein said control system further includes a catalyst temperature detector on the catalytic converter for detecting a temperature of the catalyst, and said control means causes lower hydrocarbons to be supplied in the exhaust gas at low temperatures of the catalyst and higher hydrocarbons to be supplied in the exhaust gas at high temperatures of the catalyst for maximizing the elimination of $NO_x$.

6. An improvement in an exhaust emission control system in an internal combustion engine according to claim 3, wherein said control means selectively causes increases and decreases in a concentration of hydrocarbons in the exhaust gas reaching the catalytic converter for varying the amount of $NO_x$ discharged from the catalytic converter as detected by the nitrogen oxide detector.

7. An exhaust emission control system in an internal combustion engine according to claim 1, wherein said control unit has a memory with a map of acceptable amounts of $NO_x$ corresponding to said numbers of revolutions of the engine and said engine loads.

8. An exhaust emission control system in an internal combustion engine according to claim 7, wherein said engine load is detected as intake pressure in said intake system.

9. An exhaust emission control system in an internal combustion engine according to claim 3, wherein said control means has a memory with a map of acceptable amounts of $NO_x$ corresponding to the numbers of revolutions of the engine and the engine loads.

10. An exhaust emission control system in an internal combustion engine according to claim 9, wherein the engine load is detected as an intake pressure in said intake system.

11. An exhaust emission control method for an internal combustion engine having a spark plug disposed to face a combustion chamber, an intake system in which a fuel injection valve is disposed, an exhaust system having a catalytic converter incorporated therein and filled with a catalyst for reducing nitrogen oxide ($NO_x$) in the presence of hydrocarbons in an oxidizing atmosphere, an exhaust gas circulation amount control means capable of controlling the amount of exhaust gas circulated from the exhaust system to the intake system a revolution-number detector for detecting the number of revolutions of the engine, and a load detector for detecting the load on the engine, the method comprising steps of:

detecting an amount of discharged nitrogen oxide ($NO_x$) in the exhaust system downstream from the catalytic converter;

determining an acceptable amount of $NO_x$ to be discharged in the exhaust gas based on the detected engine load and number of revolutions of the engine, and controlling at least one of the amount of exhaust gas circulated by the exhaust gas circulation amount control means, the amount of fuel injected by the fuel injection valve, the timing of fuel injected by the fuel injection valve and the timing of ignition of the spark plug for causing the amount of $NO_x$ being discharged, as detected by said nitrogen oxide detector, to become equal to or less than said predetermined acceptable amount of $NO_x$ to be discharged.

12. The method of claim 11 including the steps of detecting a temperature of the catalyst, and controlling the exhaust gas circulation amount for increasing the amount of exhaust gas circulated as the temperature of the catalyst increases.

13. The method of claim 11, including the steps of detecting a temperature of the catalyst, and causing lower hydrocarbons to be supplied in the exhaust gas at low temperatures of the catalyst and higher hydrocarbons to be supplied in the exhaust gas at high temperatures of the catalyst or maximizing the elimination of $NO_x$.

14. The method of claim 11 including the step of selectively causing increases and decreases in a concentration of hydrocarbons in the exhaust gas reaching the catalytic converter or varying the amount of $NO_x$ discharged in the exhaust gas as detected by the nitrogen oxide detector.

15. The method of claim 11, wherein the step of determining an acceptable amount of $NO_x$ includes referring to a memorized map of acceptable amounts of $NO_x$ based on the number of engine revolutions and engine load.

* * * * *